US007003313B2

(12) United States Patent
Garces et al.

(10) Patent No.: US 7,003,313 B2

(45) Date of Patent: Feb. 21, 2006

(54) METHOD FOR ENHANCING MOBILITY IN A WIRELESS MESH NETWORK

(75) Inventors: Rodrigo Garces, Santa Cruz, CA (US); Cuong-Thinh Nguyen, San Jose, CA (US); William San Filippo, III, Soquel, CA (US)

(73) Assignee: Ricochet Networks, Inc., Denver, CO (US)

( * ) Notice: Subject to any disclaimer, the term of this patent is extended or adjusted under 35 U.S.C. 154(b) by 436 days.

(21) Appl. No.: 09/894,854

(22) Filed: Jun. 27, 2001

(65) Prior Publication Data

US 2003/0003934 A1 Jan. 2, 2003

(51) Int. Cl.
*H04B 1/38* (2006.01)

(52) U.S. Cl. .............................. 455/552.1; 455/553.1; 455/444

(58) Field of Classification Search ............ 455/552.1, 455/554, 444, 503, 442, 553.1, 11.1, 426.1, 455/461, 554.1, 554.2; 379/156
See application file for complete search history.

(56) References Cited

U.S. PATENT DOCUMENTS 4,718,081 A 1/1988 Brenig
5,265,150 A * 11/1993 Helmkamp et al. ......... 455/555
5,349,342 A 9/1994 Nilles et al.
5,479,400 A * 12/1995 Dilworth et al. ............ 370/331
5,515,369 A 5/1996 Flammer, III et al.
5,757,846 A 5/1998 Vasudevan
5,841,854 A * 11/1998 Schumacher et al. .. 379/265.11
5,857,154 A * 1/1999 Laborde et al. ............. 455/444
5,859,840 A 1/1999 Tiedemann, Jr. et al.
5,903,846 A * 5/1999 Finch et al. ................ 455/462
6,067,460 A * 5/2000 Alanara et al. ............. 455/574
6,230,012 B1 5/2001 Willkie et al.
6,308,062 B1 * 10/2001 Chien et al. ................ 455/420
6,327,470 B1 12/2001 Ostling
6,330,447 B1 12/2001 Hengeveld
6,404,775 B1 * 6/2002 Leslie et al. ................ 370/466
6,487,410 B1 * 11/2002 Kontio et al. ............... 455/437
6,640,100 B1 * 10/2003 Kojima et al. ........... 455/426.2
2001/0007821 A1 * 7/2001 Ricard et al. ............... 455/552
2003/0017843 A1 * 1/2003 Noblins ...................... 455/553

FOREIGN PATENT DOCUMENTS

WO WO 96/03010 * 1/1996

OTHER PUBLICATIONS

Kahn, Robert E., et al., *Advances in Packet Radio Technology,* Proceedings of the IEEE, Nov. 1978, vol. 66, No. 11.

* cited by examiner

*Primary Examiner*—Tilahun Gesesse
(74) *Attorney, Agent, or Firm*—Townsend and Townsend and Crew LLP

(57) ABSTRACT

In a wireless communication system having sometimes mobile subscriber units and a plurality of fixed network devices located at cell sites, a multimode acquisition protocol is provided at each subscriber unit which first senses whether the subscriber unit is static or mobile from the nature and quality of the communication links with nearby network devices and then enables an acquisition protocol suited to either static mode or mobile mode. In a specific embodiment, the protocol initiates procedures to change acquisition mode from static to mobile upon failure of the subscriber unit to sense three consecutive scheduled polling packets sent by a linked network device or upon loss of communication with any locally-known network device or upon failure to transmit 25 consecutive data packets. In such case, the procedure is initiated to determine whether it is appropriate to switch to a mobile mode for purposes of acquisition.

24 Claims, 4 Drawing Sheets

METHOD FOR ENHANCING MOBILITY IN A WIRELESS MESH NETWORK

BACKGROUND OF THE INVENTION

This invention relates to wireless digital communication systems, and in particular to microcellular packet communication systems.

As personal wireless communication systems such as in cellular telephony proliferate, the spectrum available to the wireless user for accessing cell sites for interactive communication becomes premium. There is great pressure to shrink the cell size of cellular telephone systems, for example, in order to promote frequency reuse and ultimately increase user density and capacity, as well as to reduce the required transmitter power for battery-operated portables. This is part of the trend toward so-called microcellular systems.

An example of such a microcellular system is U.S. Pat. No. 5,515,369 entitled "Method For Frequency Sharing And Frequency Punchout In Frequency Hopping Communications Network" inventor George Flammer, III, et. al. issued May 7, 1996, (herein "Flammer") which is herein incorporated by reference. Flammer describes a wireless packet communication system having a plurality of nodes, each having a transmitter and a receiver, the receiver at each node is assigned a seed value and is provided with a channel punchout mask, i.e., channel mask. A node uses its seed value and channel mask to generate a specific randomly ordered channel hopping band plan on which to receive signals. A node transmits its seed value and channel mask to target nodes with which it wants to establish communication links, and those target nodes each use the seed value and channel mask to generate the randomly ordered channel hopping band plan for that node.

As the size of cells decreases and the need for mobility of subscriber units increases, the need for reliable and seamless communication between mobile subscriber units and cell sites increases. In a data communication system such as a wireless mesh network, a subscriber unit moving at a rate of 70 mph would transit cells set on one-quarter mile centers in about 13 seconds. While 13 seconds is adequate time to exchange a substantial amount of data, the acquisition time to establish communication between a subscriber unit and a cell site can frequently exceed 13 seconds. Hence communications between mobile subscriber unit and a series of cell sites can fail altogether. What is needed is a protocol, which promotes reliable acquisition and communication of mobile subscriber units in a microcellular environment.

SUMMARY OF THE INVENTION

According to the invention, in a wireless communication system having sometimes mobile subscriber units and a plurality of fixed network devices located at cell sites, such as microcellular sites, a multimode acquisition protocol is provided at each subscriber unit which first senses whether the subscriber unit is static or mobile from the nature and quality of the communication links with nearby network devices and then enables an acquisition protocol suited to either static mode or mobile mode. In a specific embodiment, the protocol initiates procedures to change acquisition mode from static to mobile upon failure of the subscriber unit to sense three consecutive scheduled polling packets sent by a linked network device or upon loss of communication with any locally-known network device or upon failure to transmit 25 consecutive data packets. In such case, the procedure is initiated to determine whether it is appropriate to switch to a mobile mode for purposes of acquisition.

The invention will be better understood by reference to the following detailed description in connection with the accompanying drawings.

DESCRIPTION OF THE SPECIFIC EMBODIMENTS

Figure 1:
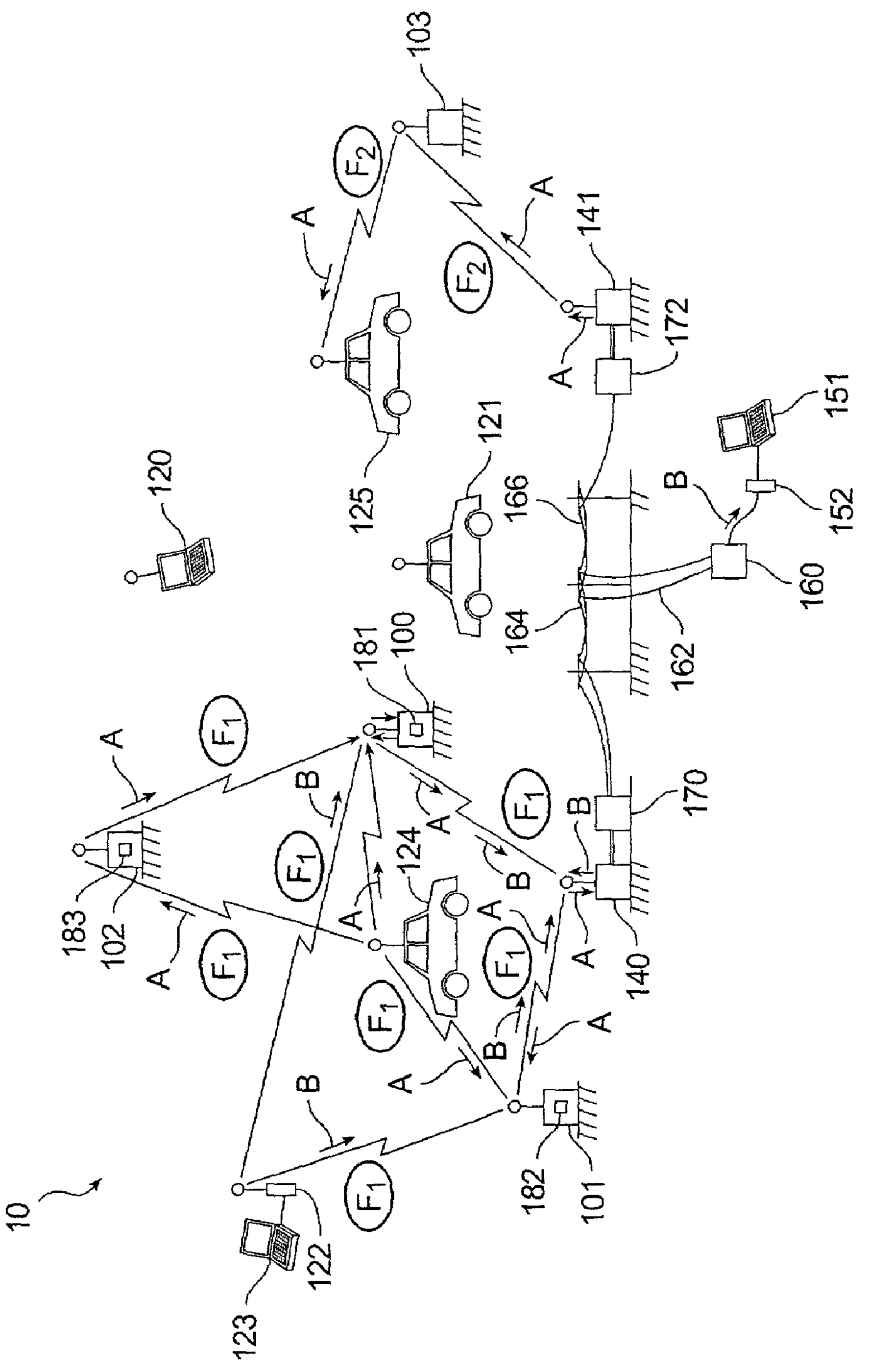
FIG. 1 is a block diagram of a microcellular network having network devices and mobile subscriber units.

Referring to FIG. 1, a microcellular network 10 having network devices 120 and mobile subscriber units 125 or user systems 120, 121, 124, 125, which include packet terminal node controller-equipped transceivers 122 and typically a user terminal device 123, which includes a processor and a memory (not shown), for example, a Personal Computer (PC), Personal Digital Assistant (PDA), mobile telephone or laptop/notebook computer. The user systems may communicate over conventional wired telecommunication lines 162, 164 with other like devices, e.g., a PC 151 having a modem 152, connected to a central office switch 160. Trunk terminals or concentrators 170, 172 may provide the interface to the telephone lines 164, 166. In accordance with an embodiment of the invention, the microcellular wireless system 10 employs a plurality of fixed site repeaters 100, 101, 102,103 to capture the signals of the transceivers.

An illustrative example is useful in understanding an embodiment of the invention. A mobile transceiver node equipped vehicle 124 originates a message comprising a sequence of message segments; such as a self-contained digitized message segment A in packet format (with address header, etc.) on a frequency F1. Because it is in packet format, the message segment A is essentially self-contained and includes in its header the information needed to address it to a local destination and to an ultimate destination, namely, a number of fixed site repeaters 100, 101, 102, and ultimately another terminal, such as mobile transceiver node 125. The message A is sent to one or more fixed site repeaters 100, 101, 102 known to the mobile transceiver 124, targeted in a sequence of directed acknowledgeable message segments via a communication link maintained between the terminal 124 and each of the various repeaters 100, 101, 102, each having a different local address. Imbedded within the fixed site repeaters are controllers 181, 182, 183 for responding to, readdressing and distributing the packets containing message segment A received from the mobile transceiver 124. The message segment A is relayed according to the embodiment under supervision of the controllers 181, 182 183 by the fixed site repeaters 100, 101, 102 following receipt of the message segment originating at terminal 124 on the same frequency F1, the message segment A addressed initially for example to fixed site repeater 102 being readdressed and relayed to fixed site repeater 100, and only one message segment A from fixed site relay 100 being readdressed to a fixed site relay, such as relay 140. The message segment A is captured by relay 140 and relayed through telephone lines, if needed, to another relay 141, which transmits the readdressed message segment A on frequency F2 from its relay station to the fixed site repeater 103. The message segment A is then directed by fixed site repeater 103 on frequency F2 to the ultimate destination transceiver terminal 125.

In a similar manner, a message segment B from transceiver 122 on frequency F1 is relayed through each of repeaters 100, 101, also on frequency F1, to the relay 140 by which means of the concentrator 170 and the central switch 160 it is relayed to PC 151 via modem 152.

One of the goals for mobility in a microcellular data network (MCDN) system 10 according to the invention is to be able to deliver 28.8 kbps while mobile in 80% of the test sites in the field. In order to be able to do so, it is necessary to make certain enhancements to a normally fixed node system, particularly in the subscriber device protocol.

A subscriber device can be in two distinct states: static (not moving) or mobile (moving). A transition mechanism is provided to switch from one state to the other. Such mechanism detects if the subscriber device is currently moving or if it is static. Subscriber devices are by default set in static state.

Figure 2A:
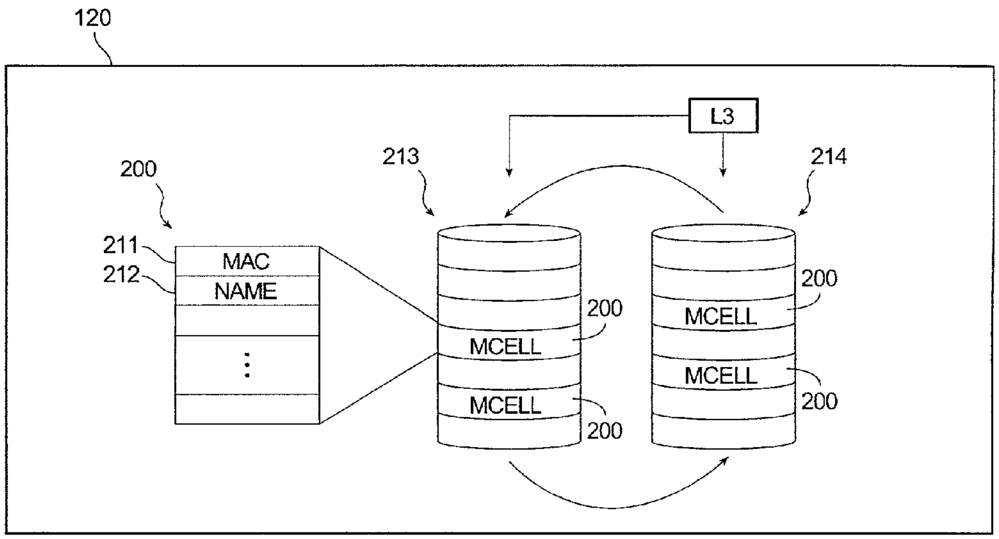
FIGS. 2A and 2B are a block diagrams illustrating the interface controls between the elements in a microcellular data network (MCDN) according to the invention.
Figure 2B:
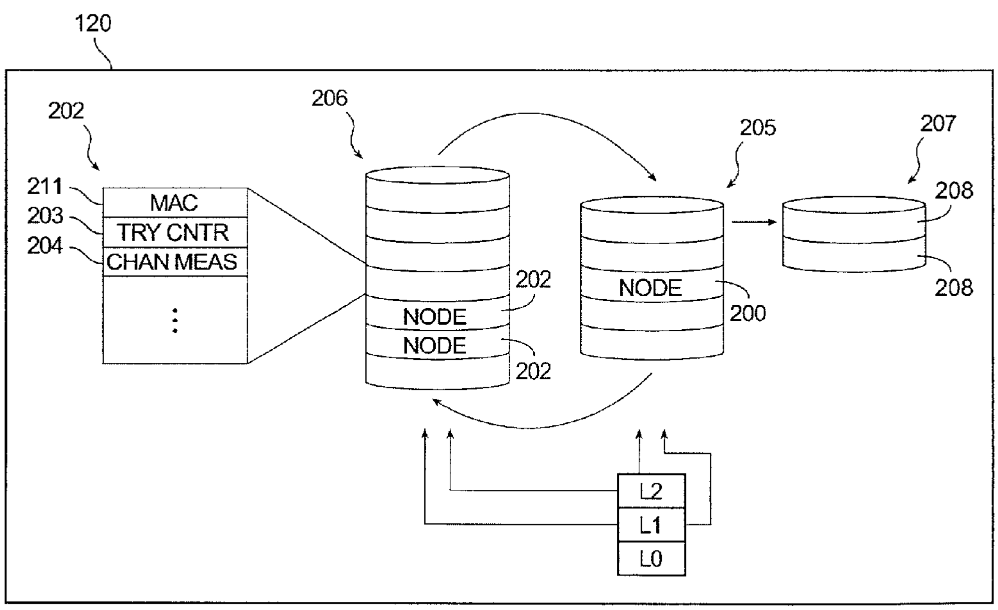

Referring to FIG. 2A, each radio or MCDN device, whether at a wired access point (WAP) 140, at a totally wireless poletop 100 or in a mobile subscriber unit 121 or fixed/portable subscriber unit 120, has a data and code structure, made up of components called herein MCELLs 200. An MCELL has a data structure which holds all of the band independent information about an MCDN device. A collection of MCELLs corresponds to the set of communication links of the subscriber unit 120 to other subscriber units, also called MCDN devices. Each link is a direct connection on a band. Each MCELL 200 has at least a MAC address 211 and a name 212. The MCELLs are stored in a free MCELL queue 213. The MCELL structure is used by the router (L3) and above. Where an active link exists, a copy of the corresponding MCELL is stored in an active MCELL queue 214.

For each active MCELL 200 there is a corresponding NODE 202 on that band. A node 202 according to the invention and as used herein is a data structure which stores all of the band-dependent information about a direct link. Specifically, each node 202 has a MAC address 211 corresponding to a respective MCELL 200, a try counter 203 and channel measures 204 for the link. The node 202 stores all of the timing information needed to target another MCDN device sharing the band of interest, along with other band dependent information. For each active node 202, there is a corresponding active link referenced in the corresponding MCELL 200. The MCELLs 200 together store (contain) all of the band-independent information for its own MCDN device 120 and other MCDN devices within its local region. The nodes 202 are stored in a free nodes queue 206 and replicated in an active nodes queue 205 wherever the corresponding MCELL 200 is in the active MCELL queue. 214.

During signal acquisition from other MCDN devices, the local MCDN device 120 collects some of the MCELL information directly from the remote MCDN devices as it is passed through it while other MCELL information which is specific to each remote MCDN device is generated locally from signal analysis or reports from other sources. Later, during maintenance, it is regularly updated.

Network devices typically broadcast heartbeat packets every 30 seconds as an economical mechanism to provide maintenance information to the radios. Typically the MCELL information of the eight best MCDN devices so acquired are placed in the active MCELL queue 213. Each node 202 increments its "try" counter 203 whenever there is a failed transmission from the local node 120, 121. The "try" counter 203 is reset to zero whenever there is a successful exchange.

In addition to the active-node queue 202, each subscriber unit 120, 121 selects the two "strongest" nodes and stores them in a two element array, called herein the strongest-node array 207. The local subscriber unit 120, 121 selects the best among the eight, called Best MCELL (BMC) 208, to which to initially route its outgoing packets.

1. Detecting Mobility

Figure 3:
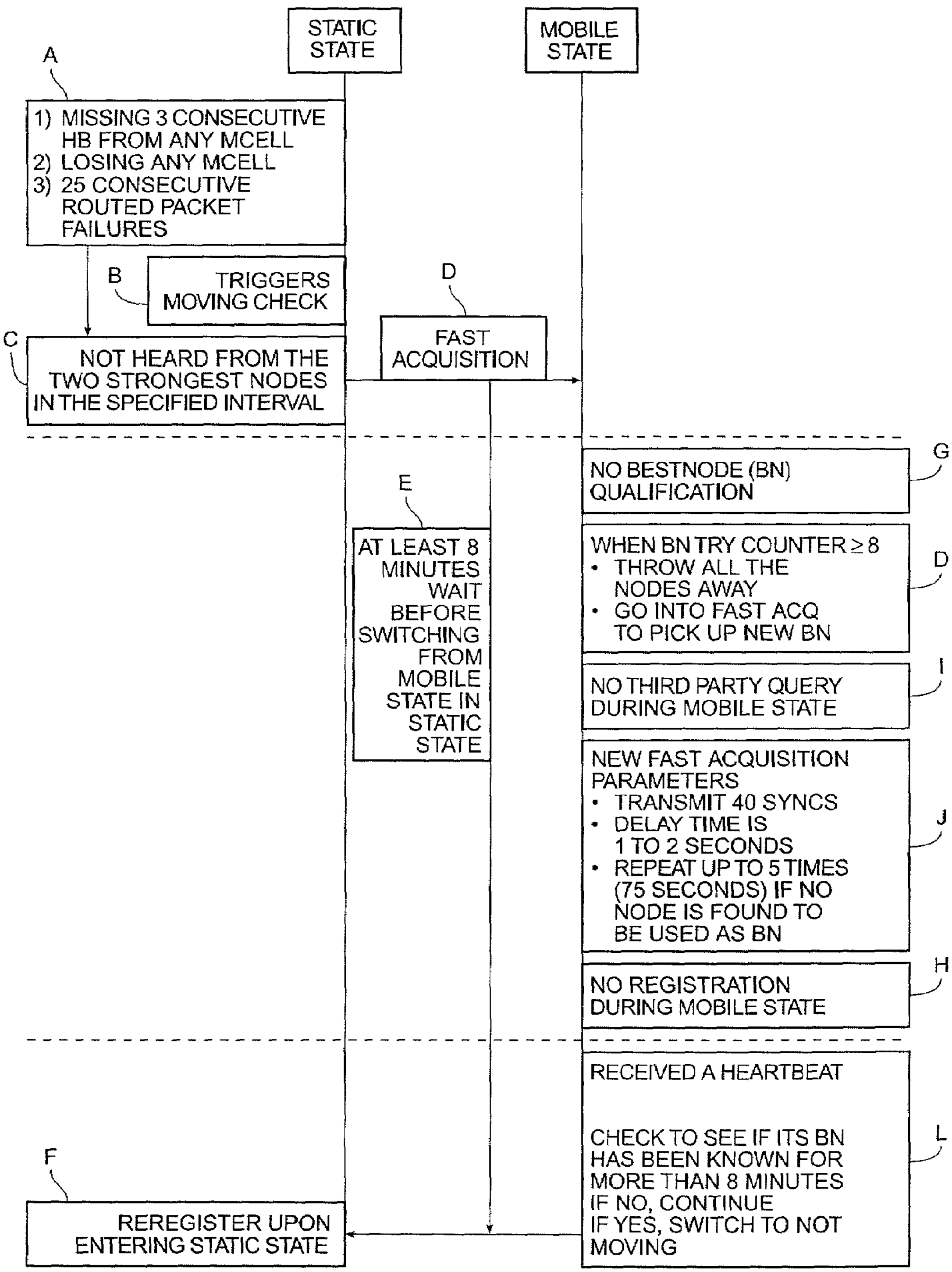
FIG. 3 is a flow chart of a specific embodiment of the mode sensing software.

Referring also to the flow diagram of FIG. 3, if a subscriber unit 120, 121 in static state misses three consecutive heartbeats from any of those MCDN devices for which the link has an MCELL, or if it loses any of its MCELL information or experiences twenty-five (or another preselected number of) consecutive failures of L3 level routed packets or makes twenty-five consecutive attempts to any MCDN device identified by its MCELL/node 200/202 on its active MCELL queue 214/active-node queue 205 (Step A), it performs a moving check test (Step B) on the two strongest nodes 208 to see if itself is moving or not. If the subscriber device 120, 121 has heard from either of the MCDN devices of the two strongest nodes, i.e., a heartbeat or a complete packet, in the specified interval, it will remain in the static state. If not (Step C), then the subscriber device will transition to the lower speed, trimmed down mobile state, removing all MCELL information entries from its MCELL queue structure and executing fast acquisition (Step D).

Whenever a heartbeat is received, a subscriber device 120, 121 will check to see if its BMC 208 has been known for more than eight (or other preselected number of) minutes (Step E). If this is the case, it will switch back to static state (Step F), where it can take advantage of the inherently better performance available in the static state. Otherwise, it stays in mobile state.

Subscriber devices change their behavior according to their state. In static state, subscriber devices 120, 121 try to remain with their BMC 208 as long as possible. In mobile state, the subscriber devices 120, 121 switch their BMCs more often and issue more sync packets.

2. Mobile State

When a subscriber device 120, 121 is in motion, the amount of time that it can use a BMC 208 is limited by the range covered by the BMC. In the worst case it will be able to remain in the coverage area of a BMC 208 for only 400 meters (0.25 miles) in a typical MCDN environment. At 110 km/h (70 mph) a subscriber device 120, 121 must detect the degradation of the current BMC 208 and thus initiate a switch to a new BMC 208 in just thirteen seconds. Therefore, in a mobile state, the best node qualification, registration and third party query processes are turned off (Steps G, H and I).

3. Acquisition of New Nodes in Mobile Mode

Figure 4:
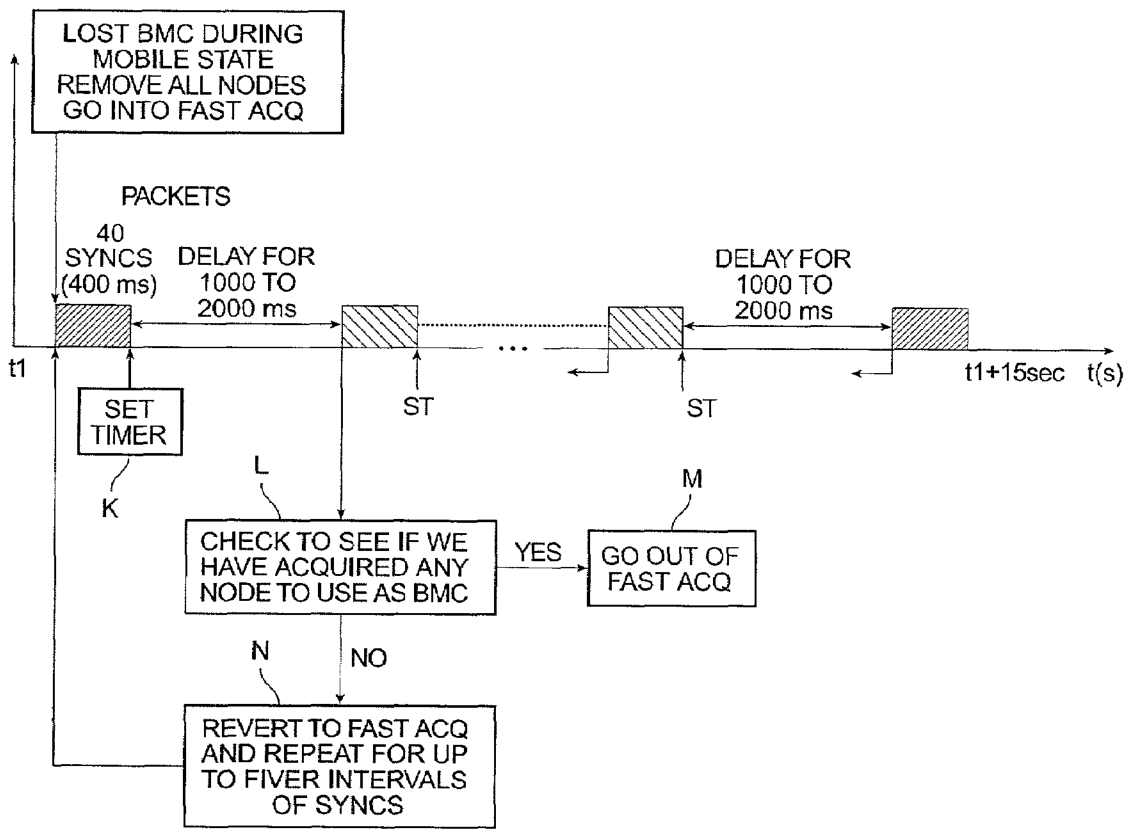
FIG. 4 is a timing diagram associated with a flow chart for illustrating mobility handoff.

When a subscriber device transitions from the static state into the mobile state, it begins with the acquisition of new radios (MCDN devices and corresponding MCELLs). It removes all the MCELL entries and performs a fast acquisition process in hopes of acquiring new MCELLS around it (Step D). During the mobile state, the subscriber devices transmit 40 sync packets (approximately 400 ms), and waits from 1 s to 2 s maximum between sync packet groups. This entire sequence is the Sync Interval or FastAcq Duration, and it is illustrated in the timeline of FIG. 4. Each such Sync Interval lasts for 15 seconds (Step J).

There is a delay between sync packets which allows network devices to transmit sync responses. Referring to FIG. 4, a timer is set (Step K) to wake up at the end of each Sync Interval, which is typically 15 seconds, to check if it has acquired any MCELLs to use as its current BMC (Step L). If this is the case it will stop the fast acquisition procedure (Step M) and resume normal operation. If on the other hand, no node has been found that can be used as its BMC, the subscriber device repeats the Sync Interval up to five times (Step N). In the worst case this procedure takes around seventy-five seconds. If, after five rounds of Sync Intervals, the subscriber device still cannot find any BMC, it will stop sending out sync packets. At this stage the modem is assumed to be out of the coverage area. Therefore, it is useless to send out sync signals, so they are curtailed to conserve the battery life of the mobile modem. The modem then relies on the Best MCELL timer, which wakes up every 10 minutes to look for Best MCELLs.

When a subscriber device fails eight consecutive times to communicate with its selected best node, it will remove all the MCELLs on its MCELL Active Queue and go into fast acquisition mode. There is no Best Node Qualification Process in the mobile state. As described above, the modem sends out a burst of sync signals, waits and then sends out another burst of sync signals and waits. If at any time at the end of each sync interval an MCELL is acquired, the modem terminates fast acquisition and starts to use that MCELL as its BMC.

Whenever a subscriber unit changes its BMC, it must perform a number of procedures. The subscriber unit modem sends forwarding packets to the former bestnode, and updates its new path to the Gateway. Again, during the mobile state, the modem does not re-register with the name server (not shown) when it changes its BMC.

5. Best MCELL Timer in Mobile State

During the mobile state, the Best MCELL timer is not used much. Instead a different timer deals with the bestnode. Whenever a layer 3 routing (L3) packet (a packet which has layer 3 information for routing) is transmitted, the subscriber device starts a timer (four seconds). This timer is meant to keep track of the bestnode to see if it is still present. When the timer is expired, the modem tries to re-qualify its bestnode. This mobile timer helps when the modem is waiting for data from its bestnode. Since it is assumed to be moving away from its bestnode at all times, the timer tells the modem when the modem can no longer talk to its bestnode. When the modem sees that its bestnode is no longer good (by failing eight (typically) consecutive times to communicate with its bestnode), it initiates fast acquisition and performs all the necessary acquisition activities. Whenever the user is out of coverage, the best MCELL (BMC) link is employed.

6. Switching from Mobile State into Static State

Each time a heartbeat is heard from any node on the active-node queue, the modem checks to see if it has known its bestnode for more than eight minutes (Step L, FIG. 3). If this is true, the modem reverts to static state.

The various protocols associated with a potentially mobile subscriber unit have now been explained and the invention has been explained with reference to specific embodiments. Other embodiments will be evident to those of ordinary skill in the art. It is therefore not intended that this invention be limited, except as indicated by the appended claims.

What is claimed is:

1. In a wireless communication system having a plurality of communication devices including mobile subscriber units within a single wireless network that may be in either static or mobile modes when operating within the single network and a plurality of fixed network devices located at cell sites for each communicating with both static and mobile subscriber units within the single network, a method for acquiring and managing a plurality of communication modes at each subscriber unit comprising:

first sensing whether the subscriber unit is static or mobile from the nature and quality of the communication links with nearby network devices; thereafter enabling an acquisition protocol suited to static mode and mobile mode for said subscriber unit;

enabling an acquisition protocol suited to mobile mode for mobile subscriber units and static mode for fixed subscriber units; and initiating procedures to determine if it is appropriate to change acquisition mode from static mode to mobile mode upon a failure of packets between the subscriber unit and other linked devices in the network.

2. The method according to claim 1, wherein the procedures are initiated to determine whether it is appropriate to change acquisition mode from static mode to mobile mode upon failure of the subscriber unit to sense a preselected number of consecutive scheduled polling packets sent by a linked device.

3. The method according to claim 2, wherein the polling packets are heartbeat packets broadcast at preselected intervals.

4. The method according to claim 1, wherein the procedures are initiated to determine whether it is appropriate to change acquisition mode from static mode to mobile mode upon failure to transmit a preselected number of consecutive data packets.

5. The method according to claim 4 further comprising:

upon decision to change to mobile mode, foregoing best node qualification.

6. The method according to claim 4 further comprising:

upon decision to change to mobile mode, foregoing registration of location with a name service.

7. The method according to claim 4 further comprising:

upon decision to change to mobile mode, transmitting sync packets at a higher repetitivity.

8. The method according to claim 4, further comprising:

upon decision to change to mobile mode, foregoing best node qualification;

foregoing registration of location with a name service;

foregoing third party query processes; and transmitting sync packets at a higher repetitivity.

9. The method according to claim 1 further comprising:

upon decision to change to mobile mode, foregoing third party query processes.

10. The method according to claim 1, further comprising:

upon a subscriber unit changing its BMC, causing said subscriber unit to send forwarding packets to its former bestnode, and updating a new corresponding path to a gateway resource.

11. The method according to claim 1, wherein communication devices store MCELL data corresponding to links to other devices, including a best link node.

12. The method according to claim 11, wherein the procedures are initiated to determine whether it is appropriate to change acquisition protocol from static mode to mobile mode upon the loss of any MCELL data.

13. The method according to claim 11, further comprising:

changing the acquisition protocol from mobile mode to static mode if the best link node is present for more than a preselected period of time.

14. In a network communication system having subscriber units within the single network that may be either static or mobile when operating within the single network and a plurality of fixed network devices located at cell sites within the single network, with at least some of the network devices for communicating with both static and mobile subscriber units, a method for acquiring and managing a plurality of communication modes at each subscriber unit comprising:

first sensing whether the subscriber unit is static or mobile from the nature and quality of the communication links with nearby network devices; thereafter enabling a first acquisition protocol suited to static mode and mobile mode for said subscriber unit;

enabling a second acquisition protocol suited to mobile mode for mobile subscriber units and static mode for fixed subscriber units; and initiating procedures to change between static mode and mobile mode upon failure of packets between the subscriber unit and other linked devices.

15. In a wireless network communication system having subscriber units within a single wireless network that may be either static or mobile when operating within the single network and a plurality of fixed network devices located at cell sites, with the network devices in a single network and for each communicating with both static and mobile subscriber units, a method for acquiring and managing a plurality of communication modes at each subscriber unit comprising:

first sensing whether the subscriber unit is static or mobile from the nature and quality of the communication links with nearby network devices; and thereafter enabling an acquisition protocol suited to mobile mode for mobile subscriber units and static mode for fixed subscriber units, with the mode based on the nature and quality of the communication links; and determining whether it is appropriate to change communication mode upon failure of packets between the subscriber unit and other linked devices in the network.

16. In a wireless mesh network communication system for a single wireless network having subscriber units, some of which are at least at times mobile, and having a plurality of fixed network devices located at cell sites, with at least some of the network devices for communicating with both static and mobile subscriber units operating within the single network, an acquisition protocol for use in communicating between the subscriber units and the fixed network devices, comprising:

a static mode for use when a subscriber unit is fixed and not mobile; and a mobile mode for use when a subscriber unit is mobile, the mobile mode being lower speed and trimmed downed from the static mode; and determining if it is appropriate to change from static mode to mobile mode upon failure of packets between a subscriber unit and a network device.

17. The acquisition protocol of claim 16, wherein procedures are initiated to determine whether it is appropriate to change the acquisition mode from static mode to mobile mode upon failure of the subscriber unit to sense a preselected number of consecutive scheduled polling packets sent by a linked device.

18. The acquisition protocol of claim 16, wherein procedures are initiated to determine whether it is appropriate to change acquisition mode from static mode to mobile mode upon failure to transmit a preselected number of consecutive data packets.

19. The acquisition protocol of claim 18, wherein upon determination to change to mobile mode, foregoing best node qualification.

20. The acquisition protocol of claim 18, wherein upon determination to change to mobile mode, foregoing registration of location with a name service.

21. The acquisition protocol of claim 18, wherein upon determination to change to mobile mode, transmitting sync packets at a higher repetitivity.

22. The acquisition protocol of claim 18, wherein upon determination to change to mobile mode, foregoing third party query processes.

23. The acquisition protocol of claim 18, wherein upon determination to change to mobile mode, foregoing best node qualification, foregoing registration of location with a name service, foregoing third party query processes, and transmitting sync packets at a higher repetitivity.

24. The acquisition protocol of claim 18, wherein:

upon a subscriber unit changing its BMC, causing said subscriber unit to send forwarding packets to its former bestnode, and updating a new corresponding path to a gateway resource.

* * * * *